US012812411B2

(12) United States Patent
Cai et al.

(10) Patent No.: US 12,812,411 B2
(45) Date of Patent: Nov. 24, 2026

(54) OPTIMIZING WIRELESS ACCESS POINTS IN A COMBINED NETWORK USING CONTROLLERS

(71) Applicant: T-Mobile USA, Inc., Bellevue, WA (US)

(72) Inventors: Zheng Cai, Fairfax, VA (US); Zheng Fang, McLean, VA (US)

(73) Assignee: T-Mobile USA, Inc., Bellevue, WA (US)

(*) Notice: Subject to any disclaimer, the term of this patent is extended or adjusted under 35 U.S.C. 154(b) by 372 days.

(21) Appl. No.: 18/404,821

(22) Filed: Jan. 4, 2024

(65) Prior Publication Data

US 2025/0227494 A1 Jul. 10, 2025

(51) Int. Cl.
*H04W 24/02* (2009.01)
*H04W 64/00* (2009.01)
*H04W 72/0453* (2023.01)
*H04W 72/541* (2023.01)

(52) U.S. Cl.
CPC ......... *H04W 24/02* (2013.01); *H04W 64/003* (2013.01); *H04W 72/0453* (2013.01); *H04W 72/541* (2023.01)

(58) Field of Classification Search
CPC . H04W 24/02; H04W 72/541; H04W 64/003; H04W 72/0453
See application file for complete search history.

(56) References Cited

U.S. PATENT DOCUMENTS 10,021,538 B2 * 7/2018 Rajakarunanayake ...................... H04W 76/27
12,050,137 B2 * 7/2024 Zinger ................ H04L 12/2829
2009/0180431 A1 * 7/2009 Sengupta .............. H04W 72/52 370/329
2019/0045367 A1 * 2/2019 Mueck .................. H04W 72/04
2019/0320332 A1 * 10/2019 Halabian ............... H04W 16/18
2021/0011765 A1 * 1/2021 Doshi ................... G06F 9/5077
2022/0110155 A1 * 4/2022 Chou .................... H04W 24/02
2023/0007573 A1 * 1/2023 Kolan ................... H04W 72/54
2023/0141111 A1 * 5/2023 Ciochina .............. H04B 7/0626 375/267
2023/0319585 A1 * 10/2023 Zhang .................... G06N 3/098 706/12
2023/0419135 A1 * 12/2023 Ezrielev ............ G06F 16/24556
(Continued)

*Primary Examiner* — Michael J Moore, Jr.
(74) *Attorney, Agent, or Firm* — Foley IP Law, PLLC

(57) ABSTRACT

A computerized method manages the operations of wireless access points (WAPs) in a combined wireless network. A local controller is associated with a plurality of WAPs, and it obtains configuration data and location data from the plurality of WAPs. The local controller determines that a first WAP and a second WAP are neighbor WAPs using the configuration data and the location data, wherein neighbor WAPs have overlapping signal coverage areas. The local controller further receives network data from the first WAP and the second WAP. Network resource allocation instructions are generated for the first WAP and the second WAP using a network optimization model, the received network data, and the obtained configuration data. The generated network resource allocation instructions are distributed to the first WAP and the second WAP, whereby the first WAP and the second WAP are instructed to operate in ways that do not interfere with each other.

17 Claims, 5 Drawing Sheets

(56) References Cited

U.S. PATENT DOCUMENTS

| | | | | |
|---|---|---|---|---|
| 2023/0421629 | A1* | 12/2023 | Ezrielev | G06F 1/03 |
| 2024/0049206 | A1* | 2/2024 | Hévizi | H04W 24/02 |
| 2024/0298194 | A1* | 9/2024 | Mueck | G06N 20/00 |
| 2024/0422077 | A1* | 12/2024 | Gad | H04L 41/5009 |
| 2025/0048136 | A1* | 2/2025 | Moosavi | H04L 67/12 |
| 2025/0062967 | A1* | 2/2025 | Yao | H04L 41/40 |
| 2025/0071575 | A1* | 2/2025 | Rydén | H04B 17/346 |
| 2025/0088946 | A1* | 3/2025 | Grida Ben Yahya | H04L 41/16 |
| 2025/0119224 | A1* | 4/2025 | Vitthaladevuni | H04B 17/3913 |
| 2025/0175870 | A1* | 5/2025 | Alasti | H04W 36/22 |
| 2025/0212055 | A1* | 6/2025 | Smith | H04W 28/0289 |
| 2025/0227494 | A1* | 7/2025 | Cai | H04W 72/0453 |
| 2026/0101195 | A1* | 4/2026 | Desai | H04W 16/02 |

* cited by examiner

OPTIMIZING WIRELESS ACCESS POINTS IN A COMBINED NETWORK USING CONTROLLERS

BACKGROUND

Cellular networks are expensive in comparison to Wi-Fi networks in part because cellular operators must pay for the spectrum and build a more complicated wireless network. In order to provide wireless networks with higher data rates and shorter latency, dense networks with many access points must be built. However, Wi-Fi access points operate as independent radio nodes that run by themselves and there is not centralized radio controller to manage the many different access points like in cellular networks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for managing the operations of wireless access points (WAPs) in a combined wireless network is described. A local controller is associated with a plurality of WAPs, and it obtains configuration data and location data from the plurality of WAPs. The local controller determines that a first WAP of the plurality of WAPs and a second WAP of the plurality of WAPs are neighbor WAPs using the configuration data and the location data, wherein neighbor WAPs have overlapping signal coverage areas. The local controller further receives network data from the first WAP and the second WAP. Network resource allocation instructions are generated for the first WAP and the second WAP using a network optimization model, the received network data, and the obtained configuration data. The generated network resource allocation instructions are distributed to the first WAP and to the second WAP, whereby the first WAP and the second WAP are instructed to operate in ways that do not interfere with each other.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 5, the systems are illustrated as schematic drawings. The drawings may not be to scale. Any of the figures may be combined into a single example or embodiment.

DETAILED DESCRIPTION

Figure 1:
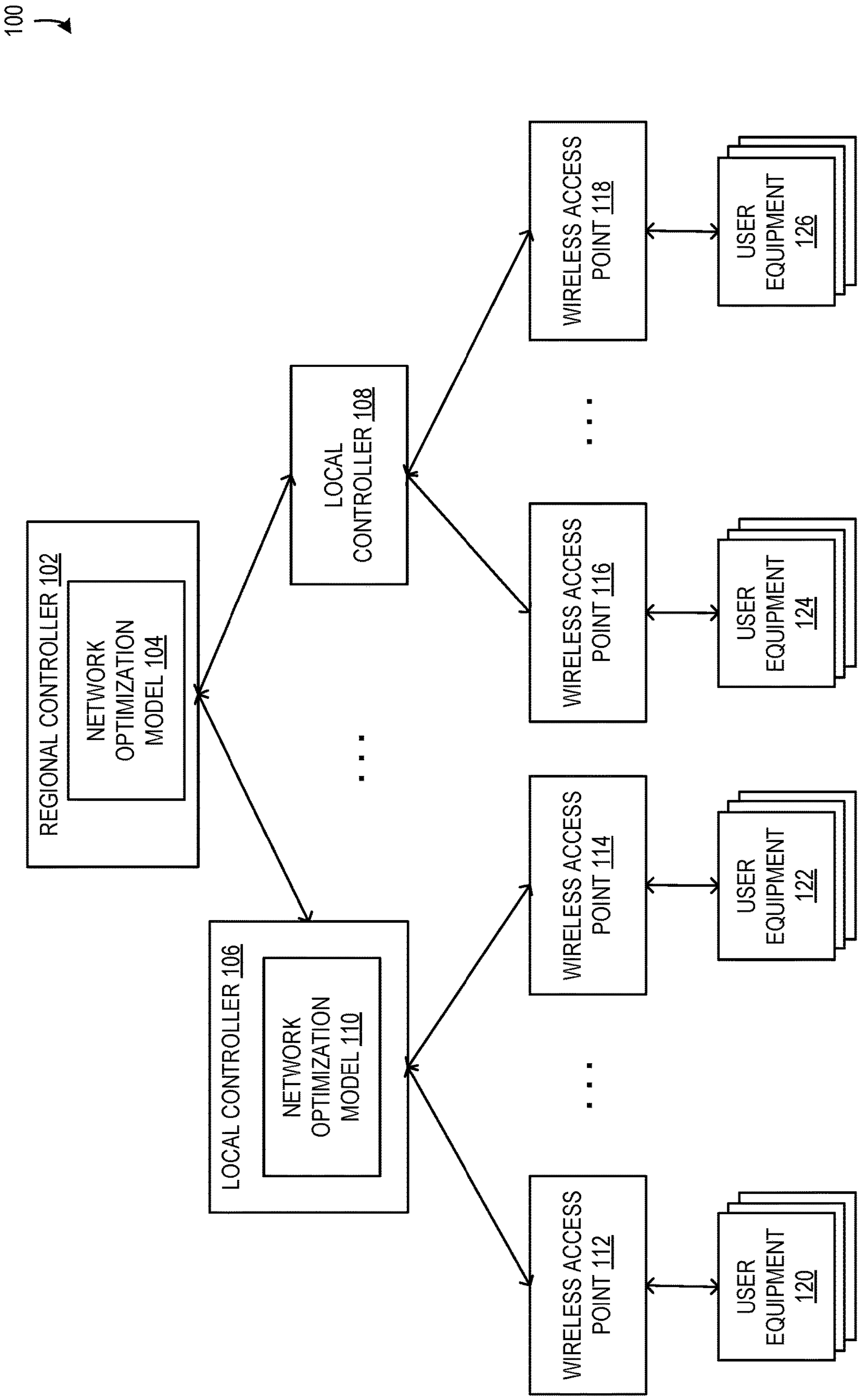
FIG. 1 is a block diagram illustrating a system for distributing network traffic using wireless access points (WAPs)

Aspects of the disclosure provide systems and methods for managing and controlling the operations of a plurality of WAPs in order to provide a combined or unified wireless network therewith. Each WAP is assigned to a local controller that is associated with the WAPs geographic area. A plurality of local controllers is used to control WAPs across a larger region of several geographic areas and a regional controller is deployed above the layer of local controllers to enable effective control of WAPs on the boundaries between two local controller-based geographic areas.

The WAPs register with their respective local controllers by sending configuration data and location data to those local controllers. This data is further provided to the regional controller by the local controllers. Each local controller is then configured to receive network data, such as network performance data, from the WAPs over time. The local controller determines which WAPs are neighbor WAPs, or WAPs with overlapping signal areas, and analyzes the network data of those neighbor WAPs to generate network resource allocation instructions for those WAPs. The local controller uses a network optimization model to perform this analysis. The generated network resource allocation instructions are distributed to the corresponding WAPs and, upon the instructions being implemented by the WAPs, the operations of the WAPs are updated to optimize the performance of the combined wireless network of the WAPs. For instance, in some examples, the network resource allocation instructions are generated to improve or optimize the throughput of the combined wireless network and/or to reduce interference between neighbor WAPs in the combined wireless network. The regional controller is configured to do substantially the same operations as the local controllers with a focus on WAPs that are associated with different local controllers but that have overlapping signal areas.

The disclosure operates in an unconventional manner at least by enabling Wi-Fi access points and/or other independent WAPs to be used to enable a wide ranging unified wireless network that can be used to route data to user equipment (UE) devices across a large geographic region. Through the use of the described two-layer controller configuration, the interference between independent WAPs is substantially reduced and the overall throughput of the combined wireless network is increased. Such a combined wireless network can be used in concert with cellular networks to provide high-quality, uninterrupted network access to a wide variety of UE devices over large regions using existing WAPs.

Further, the disclosure uses machine learning (ML) models in the form of network optimization models that are trained over time. By iteratively training the network optimization models as they operate over time, the disclosure is configured to dynamically improve the accuracy and effectiveness of the generated network resource allocation instructions. Additionally, the disclosure is configured to account for changes in the set of WAPs that are registered to the disclosed controllers quickly and efficiently, such that introducing a new WAP to the network or removing a WAP from the network can be rapidly handled by generating and sending updated network resource allocation instructions to the surrounding WAPs. This substantially reduces the time and effort required to manually adjust a similar network without the described network optimization models.

FIG. 1 is a block diagram illustrating a system 100 for distributing network traffic using wireless access points 112-118. In some examples, the system 100 includes a regional controller 102, multiple local controllers 106-108, and multiple wireless access points (WAPs) 112-118. The system 100 is configured to route data and provide data to user equipment 120-126 that are wirelessly connected to or otherwise in communication with the WAPs 112-118 as illustrated.

Further, in some examples, the system 100 includes one or more computing devices (e.g., the computing apparatus of FIG. 5) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, regional controller 102 is executed on a first computing device and the local controller 106 is located on a second computing device within the system 100. The first computing device and second computing device are configured to communicate with each other via network connections. Alternatively, in some examples, other components of the regional controller 102 (e.g., the network optimization model 104 and other components thereof) are executed on separate computing devices and those separate computing devices are configured to communicate with each other via network connections during the operation of the regional controller 102. In other examples, other organizations of computing devices are used to implement system 100 without departing from the description.

The regional controller 102 includes hardware, firmware, and/or software configured to route data to and from the local controllers 106-108 and to use the network optimization model 104 to determine an efficient distribution of frequency bandwidth to be used by at least some of the WAPs 112-118 as described herein.

The local controllers 106-108 include hardware firmware, and/or software configured to route data to and from the WAPs 112-118, to route data to and from the regional controller 102, and to use network optimization models such as network optimization model 110 to determine an efficient distribution of frequency, bandwidth to be used by WAPs 112-118 associated with the local controllers 106-108. For instance, as illustrated, the WAPs 112-114 are associated with the local controller 106 and the WAPs 116-118 are associated with the local controller 108. In some such examples, the association between WAPs and local controllers is based on geography. For instance, in such an example, the WAPs 112-114 are in a geographic area that is associated with the local controller 106.

In some examples, the WAPs 112-118 include hardware, firmware, and/or software configured to communicate with the local controllers 106-108 and route data to and from the user equipment 120-126. In some such examples, a WAP 112 is a Wi-Fi router that is deployed in a location for providing wireless Internet access to user equipment 120 that is in range of the WAP 112. Further, the WAPs 112-118 are configured to provide location data and/or configuration data to the local controllers 106-108 and, indirectly, to the regional controller 102, thereby enabling the controllers 102-108 to perform network optimization analysis as described herein.

It should be understood that, in some examples, the system 100 is configured to use the controllers 102-106 to provide a unified or combined wireless network using the WAPs 112-118, which in most circumstances are independent of each other and therefore provide independent wireless networks to nearby user equipment 120-126. For instance, in an example, each of the WAPs 112-118 provide unique Wi-Fi networks, some of which overlap and interfere with each other. Through the use of the local controllers 106-108 and the regional controller 102, the WAPs 112-118 are managed as described herein to provide a single wireless network (e.g., a 6G network) in which interference between overlapping WAP areas is avoided through the analysis described herein.

In some examples, to configure the system 100, address information and location information (e.g., Global Navigation Satellite System (GNSS) location information (longitude, latitude, altitude)) of each of the WAPs 112-118 is provided to the system 100. This information is used to assign each WAP 112-118 to a local controller 106-108 based on geographic proximity to the local controller or to a geographic region with which the local controller is associated. Further, in some examples, the provided data includes configuration data of the WAPs 112-118. Such configuration data includes type data or other data that is indicative of the type, category, or kind of wireless network capabilities of the WAP (e.g., a type of Wi-Fi technology with which the WAP is compatible, such as Wi-Fi A, B, G, N, and/or AC). In some such examples, other data is provided to the system 100, such as data that is indicative of an effective distance or range of the WAP, data that is indicative of a frequency range in which the WAP can effectively operate, or the like. This provided data is obtained by the local controller 106 with which the WAP is associated and/or a regional controller 102 with which the WAP is associated, such that the controller(s) are enabled to use the data of each WAP with which they are associated to determine efficient and/or optimal configurations or arrangements of frequency ranges, communication timings, or the like.

In some examples, a local controller 106 is configured to monitor the frequencies used by each WAP in its local area (e.g., WAPs 112-114 associated with the local controller 106). Further, the local controller 106 determines which WAPs 112-114 are "neighbors" with each other by comparing the locations of the WAPs 112-114 and the effective distances or areas of the wireless signals of the WAPs 112-114. Based on this information, if two of the WAPs have overlapping effective areas (e.g., each of the two WAPs can provide wireless network connectivity to the same location), they are considered by the local controller 106 to be neighbors or neighbor WAPs. For each pair or group of neighbor WAPs, the local controller 106 is configured to analyze the available frequency ranges of the neighbor WAPs and determine an efficient way to divide or otherwise allocate those frequency ranges to the neighbor WAPs to avoid interference between the wireless signals of two or more of the neighbor WAPs.

Further, in some examples, each WAP of the WAPs 112-118 is configured to report throughput information and/or other performance information to its associated local controller 106. In some examples, the reported information further includes network performance information such as Received Signal Strength Indicators (RSSI), Signal-to-Noise Ratio (SNR), and/or noise data provided to the WAPs 112-118 by user equipment 120-126 that are served by the WAPs 112-118. The reported data from the WAPs 112-118 to the local controllers 106-108 is provided periodically and/or otherwise based on occurrence of events (e.g., throughput or other indicators cross performance thresholds or ranges). This reported information from the WAPs 112-118 is used by the local controllers 106-108 with their network optimization models (e.g., network optimization model 110) to determine efficient allocation of network resources to the neighbor WAPs.

Additionally, or alternatively, in some examples, the local controllers 106-108 are configured to send identifying information and/or network information of a first WAP to neighbors of the WAP, and those neighbors are configured to share the information with the user equipment served by the neighbors. The user equipment is then configured to monitor the network performance of the neighbors of the first WAP and provide network performance information of the neighbors to the neighbors, which then provide the network performance information to the local controller 106 as described above. Thus, the local controller 106 is provided network performance information associated with each of its associated WAPs 112-114.

In some examples, the local controller 106 is configured to provide the network performance information and location information of the WAPs 112-114 to the network optimization model 110 as input and the network optimization model 110 is configured to provide a network resource allocation plan that efficiently allocates network resources while minimizing interference between neighbor WAPs. Allocation information from the network resource allocation plan is then provided to each WAP 112-114, whereby the WAPs 112-114 are instructed to operate according to the network resource allocation plan. It should be understood that the WAPs 112-114 are configured to receive the allocation information and to alter operations to comply with the allocation information. For instance, if a WAP 112 receives allocation information instructing it to only operate in a subset of its available frequency band, the WAP 112 alters its operation to operate in only that subset.

Further, in some examples, the network resource allocation plan and associated allocation information includes allocation of resources in large frequency bands (e.g., X Megahertz (MHz) in one band or two bands that comprise 50% of X MHz) or in smaller bands depending on how the network resource allocation plan is generated by the network optimization model 110.

In some examples, the network optimization model 110 is a machine learning (ML) model that has been trained to generate the network resource allocation plan or to generate output data that is then used to generate the network resource allocation plan. For instance, in an example, the network optimization model 110 is trained using ML techniques to maximize or otherwise optimize total data throughput of the set of WAPs 112-114 with which the network optimization model 110 is associated. The network optimization model 110 is provided information such as the most current throughput data associated with each of the WAPs 112-114, location information and/or relationship information indicating which WAPs 112-114 are neighbors, and/or other network performance data such as RSSI, SNR, and/or other noise measurements determined by the WAPs 112-114 and/or the user equipment 120-122 served by the WAPs 112-114.

For instance, in some examples, the network optimization model 110 is trained to optimize the throughput of a set of WAPs 112-114 by using training data that includes throughput values associated with location data, coverage area data, and used frequency band data of the set of WAPs. Many instances of such training data are provided to the network optimization model 110. The network optimization model 110 generates output that includes network resource allocation data. That output is compared to the training data and, based on the comparison, parameters, weights, or other values of the network optimization model 110 are adjusted to improve the throughput that will result from its generated network resource allocation data. In other examples, other ML techniques are used to train the network optimization model 110 without departing from the description. It should be understood that, in other examples, more or different features of the network performance are optimized by the network optimization model 110 (e.g., the model 110 is trained to reduce and/or minimize interference or signal noise of the network).

Further, it should be understood that, in some examples, each local controller 106-108 has a network optimization model that is the same as or similar to the network optimization model 110 that it uses as described herein.

The regional controller 102 includes hardware, firmware, and/or software configured to receive data from and send data to the local controllers 106. Further, in some examples, the regional controller 102 is configured to receive data associated with the WAPs 112-118, such as the location data, frequency, bandwidth data, signal range data as described herein. The regional controller 102 is configured to use the location data and signal range data of the WAPs 112-118 to identify WAPs that are neighbors with each other but that are associated with different local controllers (e.g., the WAP 114 is a neighbor to the WAP 116, but they are associated with the local controller 106 and local controller 108, respectively). In such examples, a single local controller cannot generate an effective network resource allocation plan for both of the neighbor WAPs, as the local controller does not receive data from one of the neighbor WAPs. However, the regional controller 102 is configured to receive data of the WAPs 112-118 from multiple local controllers 106-108. Thus, the regional controller 102 is configured to identify pairs or larger groups of WAPs that are neighbors but associated with different local controllers. Once such WAPs are identified, the regional controller 102 is configured to use the network optimization model 104 to analyze the data of those identified WAPs and to produce a network resource allocation plan for those WAPs, such that interference between the WAPs is reduced and/or minimized and data throughput is increased and/or optimized.

In some examples, the network optimization model 104 of the regional controller 102 has a ML model that is trained using ML techniques as described above with respect to the network optimization model 110.

Further, in some examples, the network resource allocation plan generated by the network optimization model 104 for use with neighbor WAPs that are on the boundaries between local controller areas is provided to the associated local controllers 106-108 and then forwarded by the local controllers 106-108 to the WAPs that are targets of the network resource allocation plan. Additionally, or alternatively, in some examples, the local controllers 106-108 use the network resource allocation plans from the regional controller 102 to influence the network resource allocation plans generated by their own network optimization models 110. For instance, in some examples, the network resource allocation plan generated by the regional controller 102 gives different instructions to the WAP 114 than the network resource allocation plan generated by the local controller 106. In order to avoid such instruction differences, the local controller 106 and its associated network optimization model 110 are configured to treat the instructions in a network resource allocation plan from the regional controller 102 as static and to generate a network resource allocation plan for all other WAPs 112-114 with the understanding that the boundary WAPs are to behave as instructed in the regional controller 102 network resource allocation plan.

Figure 2:
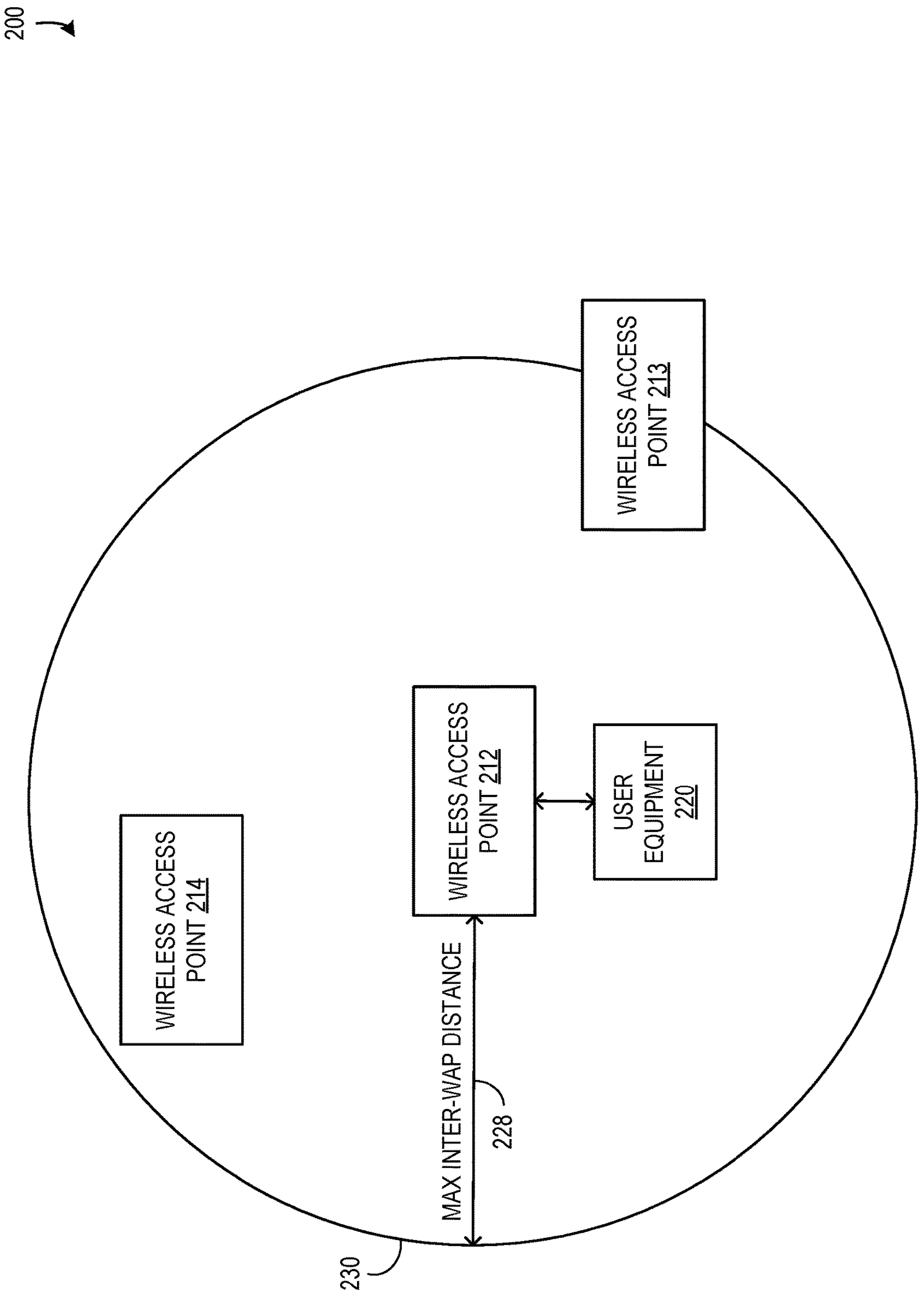
FIG. 2 is a block diagram illustrating a process for identifying neighbor WAPs among a set of WAPs.

FIG. 2 is a block diagram illustrating a process 200 for identifying neighbor WAPs (e.g., WAPs 213-214) among a set of WAPs (e.g., WAPs 212-214). In some examples, the process 200 is performed in a system such as system 100 of FIG. 1. For instance, in some examples, the local controllers 106-108 and/or the regional controller 102 is configured to perform the process 200 to determine neighbor WAPs of a given WAP using the location data, signal range data, and/or other associated data.

In an example, when a WAP 212 is registered to a local controller with a physical address, the location of that WAP 212 is identified and provided to the local controller. A maximum inter-WAP distance 228 is determined for the WAP 212 based at least on signal strength or range data of the WAP 212. In some such examples, the WAPs have a largely consistent signal range and so a largely static value is used for the maximum inter-WAP distance 228. Additionally, or alternatively, the maximum inter-WAP distance 228 is determined based on the signal ranges of pairs of WAPs. Thus, if two WAPs have signal ranges that overlap and interfere with each other, this is accounted for by the maximum inter-WAP distance 228.

Based on this maximum inter-WAP distance 228, the neighbor WAPs 213-214 of the WAP 212 are determined as any WAP that is located within the maximum inter-WAP distance 228. Circle 230 represents the area in which all neighbor WAPs of the WAP 212 are located.

User Equipment (UE) 220 uses the wireless network provided by the WAP 212 and, during its operation, UE 220 collects network performance data associated with the WAP 212 and provides that collected network performance data to the WAP 212 as described herein. Further, in some examples, the UE 220 is configured to collect network performance data from the WAP 213 and/or the WAP 214 and share that network performance data to those WAPs and/or to the WAP 212 to which it is connected. The collected network performance data is then used to generate network resource allocation instructions for one or more of the WAPs 212-214 as described herein.

It should be understood that, in other examples, other methods of determining neighbor WAPs of a WAP are used without departing from the description.

Figure 3:
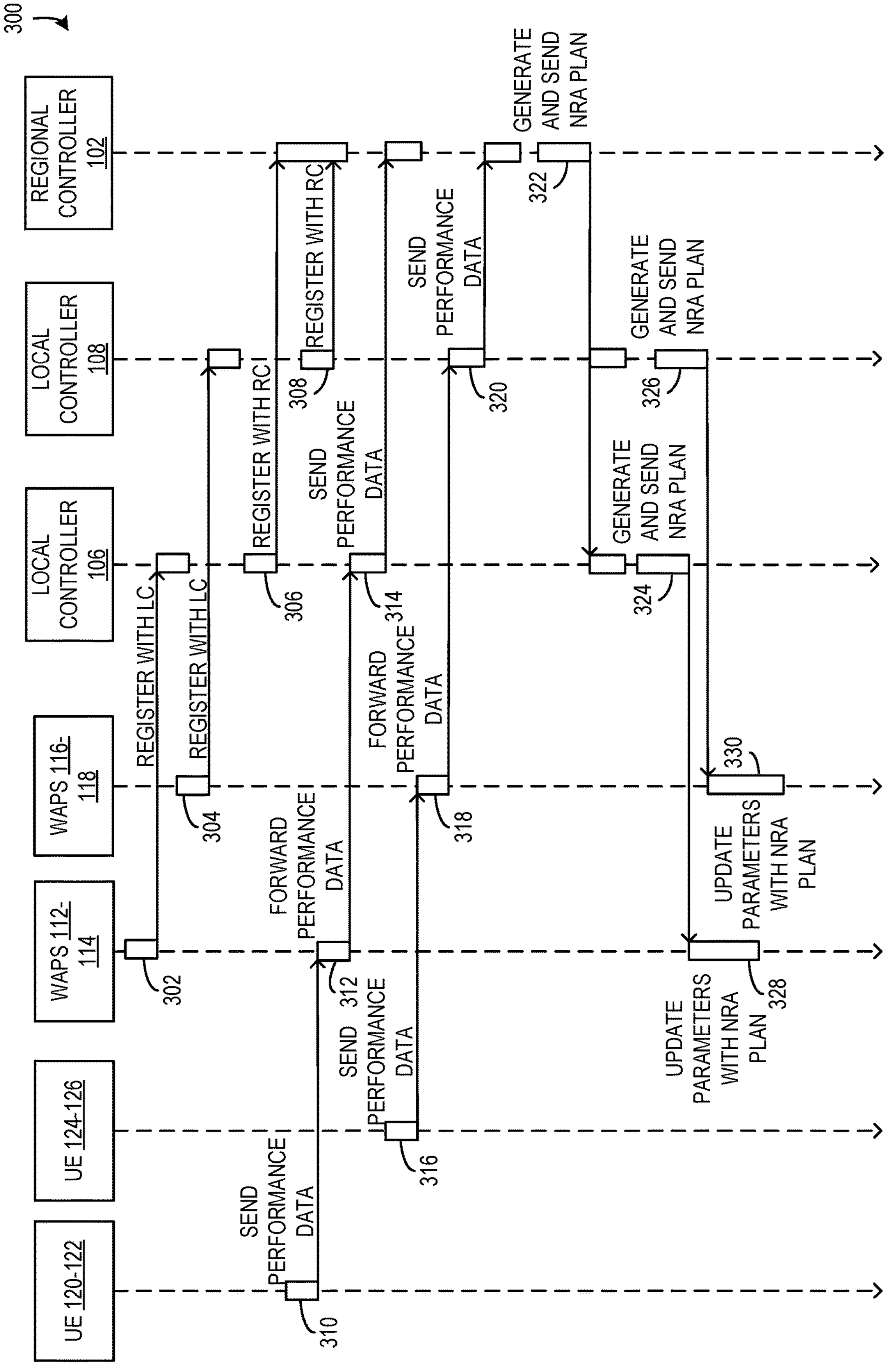
FIG. 3 is a sequence diagram illustrating a process for managing WAPs in a system.

FIG. 3 is a sequence diagram illustrating a process 300 for managing WAPs 112-118 in a system (e.g., system 100 of FIG. 1). In some examples, the process 300 is executed or otherwise performed by entities in a system such as system 100 of FIG. 1.

At 302, WAPs 112-114 register with the local controller 106. In some examples, the registration of the WAPs 112-114 with the local controller 106 includes the WAPs 112-114 each sending information such as identification information, configuration information, and/or location information to the local controller 106 as described herein. Further, in some examples, registering with the local controller 106 includes determining, by each WAP 112-118, a local controller 106 that is geographically closest or otherwise associated with the WAP's geographic location and based on that determination, registering with the determined local controller. At 304, WAPs 116-118 register with the local controller 108 in the same way as the WAPs 112-114 at 302.

At 306 and 308, the local controllers 106 and 108 register with the regional controller 102, respectively. In some examples, registering with the regional controller 102 includes sending the information from the WAPs 112-118 to the regional controller 102 to register those WAPs with the regional controller 102. Further, in some examples, the local controllers 106-108 provide controller-associated information to the regional controller 102 to enable communications between the regional controller 102 and the local controllers 106-108 throughout the process 300.

At 310, UEs 120-122 collect performance data associated with the WAPs 112-114 and send the collected performance data to the WAPs 112-114. At 312, the WAPs 112-114 forward the performance data to the local controller 106 and, at 314, the local controller 106 sends the performance data to the regional controller 102. In some examples, the performance data includes throughput data associated with data routed between the UEs 120-122 and the WAPs 112-114. Additionally, or alternatively, in some such examples, the performance data includes RSSI data, SNR data, noise data, and/or other network performance data that is collected by the UEs 120-122 in association with the WAPs 112-114. Further, in some examples, a subset of the performance data forwarded to the local controller 106 includes performance data collected by the WAPs 112-114 in association with their own performance.

At 316, UEs 124-126 collect performance data associated with the WAPs 116-118 and send the collected performance data to the WAPs 116-118. At 318, the WAPs 116-118 forward the performance data to the local controller 108 and, at 320, the local controller 108 sends the performance data to the regional controller 102. It should be understood that, in some examples, the process of 316-320 is performed in the same way as described above with respect to 310-314.

At 322, the regional controller 102 uses the performance data, location data, and/or configuration data of the WAPs 112-118 to generate a regional network resource allocation (NRA) plan. In some examples, the generation of the regional NRA plan is performed using a network optimization model as described herein. Further, in some such examples, the generation of the regional NRA plan includes identifying pairs and/or groups of neighbor WAPs that are associated with different local controllers (e.g., a WAP 112 associated with the local controller 106 and a WAP 116 associated with the local controller 108). Generating the regional NRA plan includes generation regional NRA instructions for the identified pairs and/or groups of neighbor WAPs that are associated with different local controllers. The regional NRA instructions of the regional NRA plan are sent to the local controllers 106-108. In some examples, the regional controller 102 sends regional NRA instructions to each local controller 106-108 that are specifically intended for WAPs with which the local controllers are associated (e.g., instructions for WAPs 112-114 are sent to local controller 106 but not to local controller 108).

At 324, the local controller 106 generates and sends an NRA plan to the WAPs 112-114. In some examples, as with the regional controller 102, the local controller 106 uses performance information, location information, and/or configuration information about the WAPs 112-114 to determine neighbor WAPs and then to generate an NRA plan with NRA instructions for the neighbor WAPs. In some examples, the NRA plan is generated using a network optimization model as described herein. Further, in some examples, the local controller 106 uses the regional NRA instructions received from the regional controller 102 as static settings for the generation of the NRA plan, such that conflicting NRA instructions are not generated for WAPs 112-114 that are also targeted with regional NRA instructions.

Similarly, at 326, the local controller 106 generates and sends an NRA plan to the WAPs 116-118. In some examples, 326 is performed in the same way as 324 as described above.

At 328, the WAPs 112-114 receive the NRA plan and associated NRA instructions and update parameters associated with those NRA instructions. For instance, in an example, the WAP 112 receives an NRA instruction to use a subset of the available frequency range to communicate with UEs 120-122. As a result, the WAP 112 updates its configuration parameters such that it only uses the instructed frequency range subset to communicate with the UEs 120-122. Thus, the NRA instructions of the NRA plan are implemented by the WAPs 112-114. It should be understood that the NRA plan and associated instructions update the parameters of the WAPs 112-114 in order to improve or optimize data throughput and/or reduce or minimize signal interference between neighbor WAPs.

Similarly, at 330, the WAPs 116-118 receive the NRA plan and associated NRA instructions from the local controller 108 and update parameters associated with those NRA instructions. In some examples, 330 is performed in the same way as 328 as described above.

Figure 4:
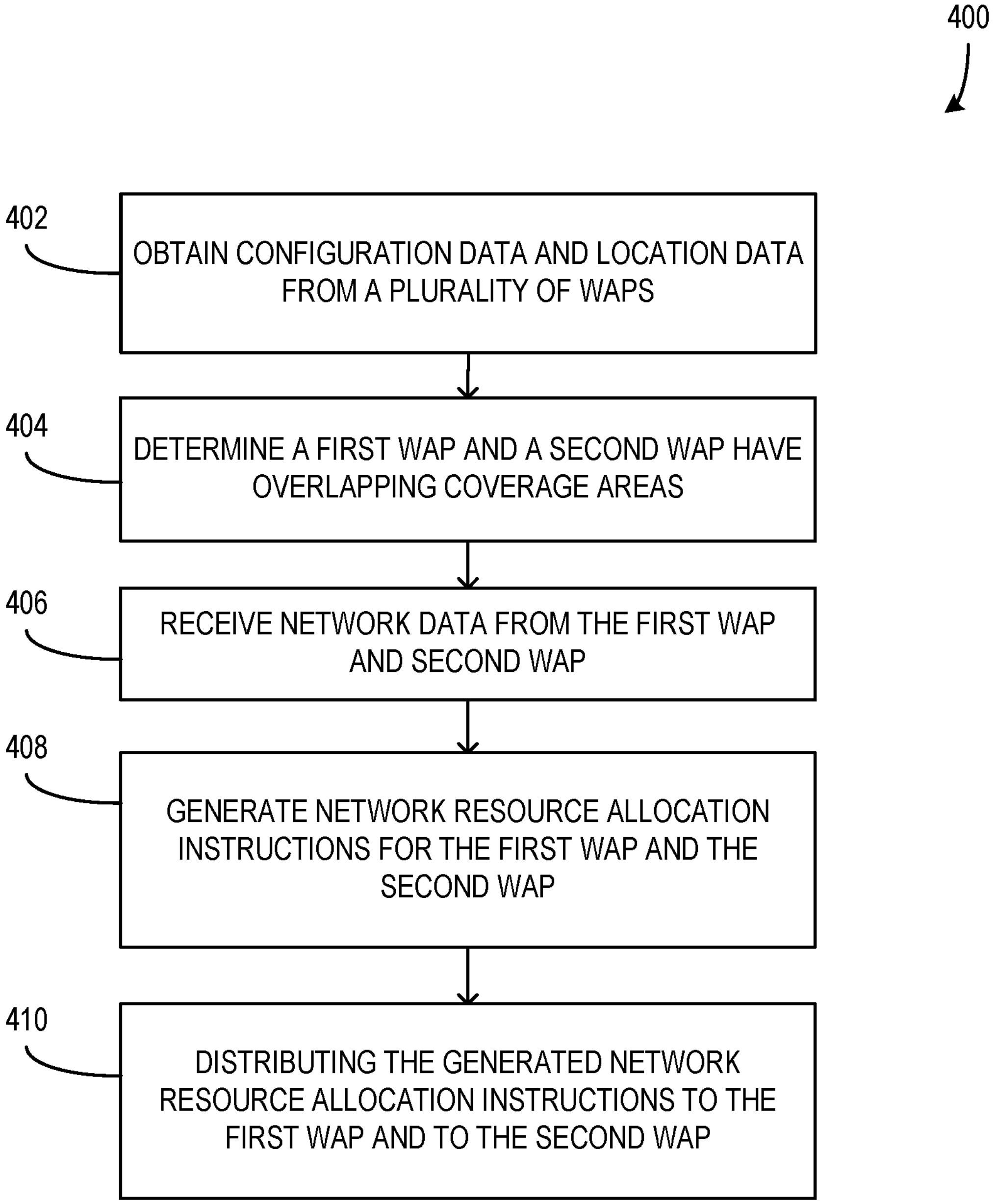
FIG. 4 is a flowchart illustrating a method for managing WAPs in a system.

FIG. 4 is a flowchart illustrating a method 400 for managing WAPs in a system (e.g., system 100 of FIG. 1). In some examples, the method 400 is executed or otherwise performed in a system such as system 100 of FIG. 1 as described herein. Further, in some such examples, the steps of the method 400 are performed by a local controller such as local controllers 106-108 in FIG. 1.

At 402, configuration data and location data are obtained from a plurality of WAPs (e.g., WAPs 112-118). In some examples, the obtained data is provided to the local controller during a registration process of the WAPs as described herein.

At 404, a first WAP and a second WAP are determined to have overlapping signal coverage areas, indicating that they are "neighbor WAPs" as described herein. In some examples, this determination uses the location data of each of the first and second WAP and, in some examples, configuration data of the WAPs that indicates their effective signal ranges. Thus, by comparing the distance between the locations of the first and second WAPs to the sum of the effective signal ranges of the first and second WAPs, it is determined that they have overlapping coverage area and are neighbors for the purposes of the described methods herein.

At 406, network data is received from the first WAP and from the second WAP. In some examples, the network data received is network data collected by UE devices which are being served by the first and second WAPs (e.g., UEs 120-122). Additionally, or alternatively, in some examples, the network data is collected by the WAPs themselves and sent to the local controller. Further, in some examples, the network data includes data indicative of the performance of the wireless networks associated with the WAPs, such as throughput data, RSSI data, SNR data, other noise-based data, or the like.

At 408, network resource allocation (NRA) instructions are generated for the first WAP and the second WAP. In some examples, the NRA instructions are generated using a network optimization model of the local controller. Further, in some examples, the NRA instructions are generated to include instructions for the first WAP to use a first frequency range and instructions for the second WAP to use a second frequency range, wherein the first frequency range and the second frequency range do not interfere with each other.

At 410, the generated NRA instructions are distributed to the first WAP and the second WAP. As a result of the NRA instructions being distributed, parameters or other features of the first and second WAPs are updated such that the first and second WAPs are configured to operate in accordance with the generated NRA instructions. For instance, in an example, the first and second WAPs are configured to use two different frequency ranges that do not interfere with each other when communicating with UE devices, as described herein.

In some examples, the method 400 is performed by multiple local controllers (e.g., local controllers 106-108) in a system, enabling the WAPs associated with those multiple local controllers to be used together as a combined wireless network with efficient throughput and low interference between WAPs. In some such examples, each local controller obtains data from the associated WAPs, determines neighbor WAPs, receives network data associated with the WAPs, generates NRA instructions for the WAPs, and distributes those NRA instructions to the WAPs, as described herein.

Additionally, or alternatively, in some examples, a regional controller performs a method similar to method 400 in which it obtains data of a plurality of WAPs from its associated local controllers, determines pairs or groups of neighbor WAPs that are associated with different local controllers, receives network data associated with the WAPs from its associated local controllers, generates NRA instructions for the determined pairs or groups of neighbor WAPs, and distributes the generated NRA instructions to the corresponding local controllers, where those NRA instructions are further used and/or distributed to WAPs as described herein at least with respect to FIG. 3.

As a result of the regional controller performing the above-described method, in some examples, the method 400 further includes providing, by the local controller, obtained configuration data and location data to the regional controller and providing the received network data to the regional controller. Then, the local controller receives regional NRA instructions for some or all of its associated WAPs. The local controller then distributes those regional NRA instructions to the targeted WAPs and/or uses the regional NRA instructions in the generation of its own NRA instructions as described herein.

Further, it should be understood that, in some examples, the method 400 is performed to enable the combined network of WAPs to route and/or serve data to UEs as a unified network (e.g., for use in enabling a 6G network). Thus, in addition to the described steps for managing the operations of the WAPs, the local controllers and/or WAPs are performing operations to route data to UEs and/or receive data from UEs.

Additionally, or alternatively, in some examples, the method 400 includes training the network optimization model of the local controller using ML techniques. In some such examples, the network optimization model is trained to improve and/or optimize the throughput of data in the WAP network and, during the course of operations, the network optimization model is adjusted to further improve its efficiency at generating accurate NRA instructions for updating the WAPs of the network.

Exemplary Operating Environment

Figure 5:
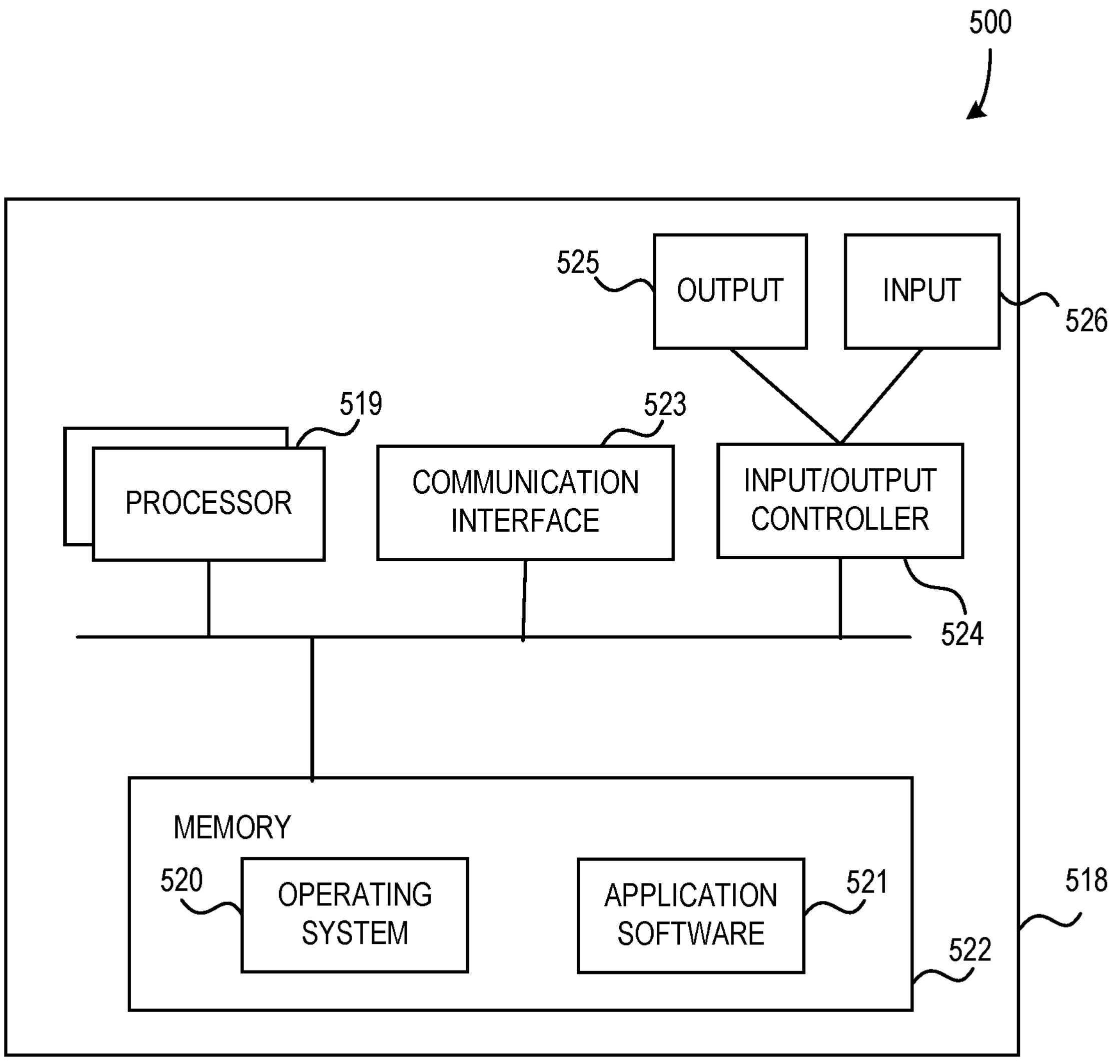
FIG. 5 illustrates an example computing apparatus as a functional block diagram.

The present disclosure is operable with a computing apparatus according to an embodiment as a functional block diagram 500 in FIG. 5. In an example, components of a computing apparatus 518 are implemented as a part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hard-coded machine. In some examples, platform software comprising an operating system 520 or any other suitable platform software is provided on the apparatus 518 to enable application software 521 to be executed on the device. In some examples, managing the operations of a group of WAPs to provide a unified wireless network as described herein is accomplished by software, hardware, and/or firmware.

In some examples, computer executable instructions are provided using any computer-readable media that is accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or a speaker, which are separate from or integral to the electronic device. Additionally, or alternatively, the input/output controller 524 is configured to receive and process an input from one or more input devices 526, for example, a keyboard, a microphone, or a touchpad. In one example, the output device 525 also acts as the input device. An example of such a device is a touch sensitive display. The input/output controller 524 may also output data to devices other than the output device, e.g., a locally connected printing device. In some examples, a user provides input to the input device(s) 526 and/or receives output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUS).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: obtain configuration data and location data from a plurality of wireless access points (WAPs); determine a first WAP of the plurality of WAPs and a second WAP of the plurality of WAPs are neighbor WAPs using the configuration data and the location data, wherein neighbor WAPs have overlapping signal coverage areas; receive network data from the first WAP and from the second WAP; generate network resource allocation instructions for the first WAP and for the second WAP using a network optimization model, the received network data, and the obtained configuration data; and distribute the generated network resource allocation instructions to the first WAP and to the second WAP, whereby the first WAP and the second WAP are instructed to operate in ways that do not interfere with each other.

An example computerized method comprises obtaining configuration data and location data from a plurality of wireless access points (WAPs); determining a first WAP of the plurality of WAPs and a second WAP of the plurality of WAPs are neighbor WAPs using the configuration data and the location data, wherein neighbor WAPs have overlapping signal coverage areas; receiving network data from the first WAP and from the second WAP; generating network resource allocation instructions for the first WAP and for the second WAP using a network optimization model, the received network data, and the obtained configuration data; and distributing the generated network resource allocation instructions to the first WAP and to the second WAP, whereby the first WAP and the second WAP are instructed to operate in ways that do not interfere with each other.

One or more computer storage media having computer-executable instructions that, upon execution by a processor, case the processor to at least: obtain configuration data and location data from a plurality of wireless access points (WAPs); determine a first WAP of the plurality of WAPs and a second WAP of the plurality of WAPs are neighbor WAPs using the configuration data and the location data, wherein neighbor WAPs have overlapping signal coverage areas; receive network data from the first WAP and from the second WAP; generate network resource allocation instructions for the first WAP and for the second WAP using a network optimization model, the received network data, and the obtained configuration data; and distribute the generated network resource allocation instructions to the first WAP and to the second WAP, whereby the first WAP and the second WAP are instructed to operate in ways that do not interfere with each other.

Alternatively, or in addition to the other examples described herein, examples include any combination of the following:

- wherein obtaining the configuration data and the location data from the plurality of WAPs includes: obtaining configuration data and location data from a first subset of WAPs of the plurality of WAPs by a first local controller with which the first subset of WAPs are associated, wherein the first subset of WAPs includes the first WAP and the second WAP; obtaining configuration data and location data from a second subset of WAPs of the plurality of WAPs by a second local controller with which the second subset of WAPs are associated, wherein the second subset of WAPs includes a third WAP and a fourth WAP; wherein determining that the first WAP and the second WAP are neighbor WAPs includes determining that the third WAP and the fourth WAP are neighbor WAPs using the obtained configuration and location data from the second subset of WAPs by the second local controller; wherein generating the network resource allocation instructions for the first WAP and for the second WAP includes: generating a first subset of the network resource allocation instructions for the first WAP and for the second WAP by the first local controller; and generating a second subset of the network resource allocation instructions for the third WAP and for the fourth WAP by the second local controller; and wherein distributing the generated network resource allocation instructions to the first WAP and to the second WAP includes: distributing the first subset of the generated network resource allocation instructions to the first WAP and to the second WAP by the first local controller; and distributing the second subset of the generated network resource allocation instructions to the third WAP and to the fourth WAP by the second local controller.
- further comprising: providing the obtained configuration data and location data to a regional controller; providing the received network data to the regional controller; and receiving regional network resource allocation instructions to the first WAP from the regional controller, wherein generating the network resource allocation instructions for the first WAP and the second WAP is based on the received regional network resource allocation instructions.
- wherein the generated network resource allocation instructions include instructions for the first WAP to use a first frequency range and instructions for the second WAP to use a second frequency range, wherein the first frequency range and second frequency range do not interfere with each other.
- wherein the received network data includes at least one of throughput data, interference data, or noise data collected a first user equipment (UE) device communicating with the first WAP and a second UE device communicating with the second WAP.
- further comprising: routing data to a plurality of UE devices via the first WAP and the second WAP as a combined wireless network.
- further comprising: training the network optimization model using machine learning techniques to improve throughput of the plurality of WAPs operating as a combined wireless network.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining configuration data and location data from a plurality of wireless access points (WAPs); exemplary means for determining a first WAP of the plurality of WAPs and a second WAP of the plurality of WAPs are neighbor WAPs using the configuration data and the location data, wherein neighbor WAPs have overlapping signal coverage areas; exemplary means for receiving network data from the first WAP and from the second WAP; exemplary means for generating network resource allocation instructions for the first WAP and for the second WAP using a network optimization model, the received network data, and the obtained configuration data; and exemplary means for distributing the generated network resource allocation instructions to the first WAP and to the second WAP, whereby the first WAP and the second WAP are instructed to operate in ways that do not interfere with each other.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory comprising computer program code, the memory and the computer program code configured to cause the processor to:

obtain configuration data and location data from a plurality of wireless access points (WAPs);

determine a first WAP of the plurality of WAPs and a second WAP of the plurality of WAPs are neighbor WAPs using the configuration data and the location data, wherein the neighbor WAPs have overlapping signal coverage areas;

receive network data from the first WAP and from the second WAP;

generate, by a controller associated with the plurality of WAPs, network resource allocation instructions for the first WAP and for the second WAP using a network optimization model, the received network data, and the obtained configuration data; and distribute, by the controller, the network resource allocation instructions to the first WAP and to the second WAP, wherein the network resource allocation instructions instruct the first WAP and the second WAP to use different frequency ranges for WiFi signals communicated by first WAP and the second WAP, respectively.

2. The system of claim 1, wherein obtaining the configuration data and the location data from the plurality of WAPs includes:

obtaining configuration data and location data from a first subset of WAPs of the plurality of WAPs by a first local controller with which the first subset of WAPs are associated, wherein the first subset of WAPs includes the first WAP and the second WAP;

obtaining configuration data and location data from a second subset of WAPs of the plurality of WAPs by a second local controller with which the second subset of WAPs are associated, wherein the second subset of WAPs includes a third WAP and a fourth WAP;

wherein determining that the first WAP and the second WAP are neighbor WAPs includes determining that the third WAP and the fourth WAP are neighbor WAPs using the obtained configuration and location data from the second subset of WAPs by the second local controller;

wherein generating the network resource allocation instructions for the first WAP and for the second WAP includes:

generating a first subset of the network resource allocation instructions for the first WAP and for the second WAP by the first local controller; and generating a second subset of the network resource allocation instructions for the third WAP and for the fourth WAP by the second local controller; and wherein distributing the network resource allocation instructions to the first WAP and to the second WAP includes:

distributing the first subset of the network resource allocation instructions to the first WAP and to the second WAP by the first local controller; and distributing the second subset of the network resource allocation instructions to the third WAP and to the fourth WAP by the second local controller.

3. The system of claim 1, wherein the memory and the computer program code are configured to further cause the processor to:

provide the obtained configuration data and location data to a regional controller; provide the received network data to the regional controller; and receive regional network resource allocation instructions to the first WAP from the regional controller, wherein generating the network resource allocation instructions for the first WAP and the second WAP is based on the received regional network resource allocation instructions.

4. The system of claim 1, wherein the received network data includes at least one of throughput data, interference data, or noise data collected by a first user equipment (UE) device communicating with the first WAP and a second UE device communicating with the second WAP.

5. The system of claim 1, wherein the memory and the computer program code are configured to further cause the processor to:

route data to a plurality of UE devices via the first WAP and the second WAP as a combined wireless network.

6. The system of claim 1, wherein the memory and the computer program code are configured to further cause the processor to:

train the network optimization model using machine learning techniques to improve throughput of the plurality of WAPs operating as a combined wireless network.

7. A computerized method comprising:

obtaining configuration data and location data from a plurality of wireless access points (WAPs);

determining a first WAP of the plurality of WAPs and a second WAP of the plurality of WAPs are neighbor WAPs using the configuration data and the location data, wherein the neighbor WAPs have overlapping signal coverage areas;

receiving network data from the first WAP and from the second WAP;

generating, by a controller associated with the plurality of WAPs, network resource allocation instructions for the first WAP and for the second WAP using a network optimization model, the received network data, and the obtained configuration data; and distributing, by the controller, the network resource allocation instructions to the first WAP and to the second WAP, wherein the network resource allocation instructions instruct the first WAP and the second WAP to use different frequency ranges for WiFi signals communicated by first WAP and the second WAP, respectively.

8. The computerized method of claim 7, wherein obtaining the configuration data and the location data from the plurality of WAPs includes:

obtaining configuration data and location data from a first subset of WAPs of the plurality of WAPs by a first local controller with which the first subset of WAPs are associated, wherein the first subset of WAPs includes the first WAP and the second WAP;

obtaining configuration data and location data from a second subset of WAPs of the plurality of WAPs by a second local controller with which the second subset of WAPs are associated, wherein the second subset of WAPs includes a third WAP and a fourth WAP;

wherein determining that the first WAP and the second WAP are neighbor WAPs includes determining that the third WAP and the fourth WAP are neighbor WAPs using the obtained configuration and location data from the second subset of WAPs by the second local controller;

wherein generating the network resource allocation instructions for the first WAP and for the second WAP includes:

generating a first subset of the network resource allocation instructions for the first WAP and for the second WAP by the first local controller; and generating a second subset of the network resource allocation instructions for the third WAP and for the fourth WAP by the second local controller; and wherein distributing the network resource allocation instructions to the first WAP and to the second WAP includes:

distributing the first subset of the network resource allocation instructions to the first WAP and to the second WAP by the first local controller; and distributing the second subset of the network resource allocation instructions to the third WAP and to the fourth WAP by the second local controller.

9. The computerized method of claim 7, further comprising:

providing the obtained configuration data and location data to a regional controller;

providing the received network data to the regional controller; and receiving regional network resource allocation instructions to the first WAP from the regional controller, wherein generating the network resource allocation instructions for the first WAP and the second WAP is based on the received regional network resource allocation instructions.

10. The computerized method of claim 7, wherein the received network data includes at least one of throughput data, interference data, or noise data collected by a first user equipment (UE) device communicating with the first WAP and a second UE device communicating with the second WAP.

11. The computerized method of claim 7, further comprising:

routing data to a plurality of UE devices via the first WAP and the second WAP as a combined wireless network.

12. The computerized method of claim 7, further comprising:

training the network optimization model using machine learning techniques to improve throughput of the plurality of WAPs operating as a combined wireless network.

13. A computer storage medium having computer-executable instructions that, upon execution by a processor, cause the processor to at least:

obtain configuration data and location data from a plurality of wireless access points (WAPs);

determine a first WAP of the plurality of WAPs and a second WAP of the plurality of WAPs are neighbor WAPs using the configuration data and the location data, wherein the neighbor WAPs have overlapping signal coverage areas;

receive network data from the first WAP and from the second WAP;

generate, by a controller associated with the plurality of WAPs, network resource allocation instructions for the first WAP and for the second WAP using a network optimization model, the received network data, and the obtained configuration data; and distribute, by the controller, the network resource allocation instructions to the first WAP and to the second WAP, wherein the network resource allocation instructions instruct the first WAP and the second WAP to use different frequency ranges for WiFi signals communicated by first WAP and the second WAP, respectively.

14. The computer storage medium of claim 13, wherein obtaining the configuration data and the location data from the plurality of WAPs includes:

obtaining configuration data and location data from a first subset of WAPs of the plurality of WAPs by a first local controller with which the first subset of WAPs are associated, wherein the first subset of WAPs includes the first WAP and the second WAP;

obtaining configuration data and location data from a second subset of WAPs of the plurality of WAPs by a second local controller with which the second subset of WAPs are associated, wherein the second subset of WAPs includes a third WAP and a fourth WAP;

wherein determining that the first WAP and the second WAP are neighbor WAPs includes determining that the third WAP and the fourth WAP are neighbor WAPs using the obtained configuration and location data from the second subset of WAPs by the second local controller;

wherein generating the network resource allocation instructions for the first WAP and for the second WAP includes:

generating a first subset of the network resource allocation instructions for the first WAP and for the second WAP by the first local controller; and generating a second subset of the network resource allocation instructions for the third WAP and for the fourth WAP by the second local controller; and wherein distributing the network resource allocation instructions to the first WAP and to the second WAP includes:

distributing the first subset of the network resource allocation instructions to the first WAP and to the second WAP by the first local controller; and distributing the second subset of the network resource allocation instructions to the third WAP and to the fourth WAP by the second local controller.

15. The computer storage medium of claim 13, wherein the computer-executable instructions, upon execution by a processor, further cause the processor to at least:

provide the obtained configuration data and location data to a regional controller; provide the received network data to the regional controller; and receive regional network resource allocation instructions to the first WAP from the regional controller, wherein generating the network resource allocation instructions for the first WAP and the second WAP is based on the received regional network resource allocation instructions.

16. The computer storage medium of claim 13, wherein the received network data includes at least one of throughput data, interference data, or noise data collected by a first user equipment (UE) device communicating with the first WAP and a second UE device communicating with the second WAP.

17. The computer storage medium of claim 13, wherein the computer-executable instructions, upon execution by a processor, further cause the processor to at least:

route data to a plurality of UE devices via the first WAP and the second WAP as a combined wireless network.

* * * * *